US008935674B2

(12) United States Patent
Pistoia et al.

(10) Patent No.: US 8,935,674 B2
(45) Date of Patent: *Jan. 13, 2015

(54) DETERMINING CORRECTNESS CONDITIONS FOR USE IN STATIC ANALYSIS (75) Inventors: Marco Pistoia, Amawalk, NY (US); Omer Tripp, Har-Adar (IL)

(73) Assignee: International Business Machines Corporation, Armonk, NY (US)

( * ) Notice: Subject to any disclaimer, the term of this patent is extended or adjusted under 35 U.S.C. 154(b) by 46 days.

This patent is subject to a terminal disclaimer.

(21) Appl. No.: 13/586,621

(22) Filed: Aug. 15, 2012

(65) Prior Publication Data

US 2014/0053136 A1 Feb. 20, 2014

(51) Int. Cl.
G06F 9/44 (2006.01)
(52) U.S. Cl.
USPC ............................................. 717/126; 717/124
(58) Field of Classification Search
USPC ........................................................ 717/126
See application file for complete search history.

(56) References Cited

U.S. PATENT DOCUMENTS

| 5,987,252 | A  | * | 11/1999 | Leino et al. ................... 717/126 |
| 6,071,316 | A  | * | 6/2000  | Goossen et al. ............... 717/126 |
| 6,343,376 | B1 | * | 1/2002  | Saxe et al. ..................... 717/154 |
| 6,553,362 | B2 | * | 4/2003  | Saxe et al. ....................... 706/47 |
| 6,820,251 | B1 | * | 11/2004 | Dwyer ........................... 717/130 |
| 7,024,661 | B2 | * | 4/2006  | Leino et al. .................... 717/126 |
| 7,900,193 | B1 | * | 3/2011  | Kolawa et al. ................. 717/126 |
| 8,042,179 | B2 | * | 10/2011 | Shoji et al. ....................... 726/22 |
| 8,201,160 | B2 | * | 6/2012  | Hauser ........................... 717/156 |
| 8,352,918 | B2 | * | 1/2013  | Cuoq et al. .................... 717/126 |
| 8,359,576 | B2 | * | 1/2013  | Prasad et al. .................. 717/124 |
| 8,402,444 | B2 | * | 3/2013  | Ball et al. ....................... 717/128 |
| 8,528,095 | B2 | * | 9/2013  | Haviv et al. ...................... 726/25 |
| 8,745,578 | B2 | * | 6/2014  | Pistoia et al. .................. 717/104 |
| 2002/0046393 | A1 | * | 4/2002 | Leino et al. ........................ 717/7 |
| 2002/0062476 | A1 | * | 5/2002 | Saxe et al. ..................... 717/126 |
| 2002/0083418 | A1 | * | 6/2002 | Saxe et al. ..................... 717/126 |
| 2005/0015752 | A1 |   | 1/2005 | Alpern et al. |
| 2009/0070753 | A1 |   | 3/2009 | Chen et al. |
| 2010/0115493 | A1 | * | 5/2010 | Cuoq et al. .................... 717/126 |

(Continued)

FOREIGN PATENT DOCUMENTS

IN 190469 A1 8/2003

OTHER PUBLICATIONS

Osterweil, "The Detention of Unexecutable Program Paths Through Static Data Flow Analysis," The University of Colorado at Boulder, Boulder, Colorado, May 31, 1977, 30 pages.

(Continued)

*Primary Examiner* — Don Wong
*Assistant Examiner* — Marina Lee
(74) *Attorney, Agent, or Firm* — Anne Dougherty; Yee & Associates, P.C.

(57) ABSTRACT

An embodiment comprising a method is associated with static analysis of a program, which detects violations of conditions of the program correctness specification. The method includes selectively encoding the program and adding one or more correctness conditions to the encoded program, wherein the added conditions comprise a set of assumptions that render the program correct with respect to one or more properties pertaining to detected violations. The set of assumptions are reported to a program user, together with a request to the user to verify the validity of each assumption of the set.

18 Claims, 4 Drawing Sheets

(56) References Cited

U.S. PATENT DOCUMENTS

| | | | |
|---|---|---|---|
| 2011/0088016 A1* | 4/2011 | Ball et al. | 717/128 |
| 2012/0084761 A1 | 4/2012 | Maeda et al. | |
| 2013/0145215 A1* | 6/2013 | Pistoia et al. | 714/38.1 |
| 2014/0053130 A1* | 2/2014 | Pistoia et al. | 717/110 |
| 2014/0053136 A1* | 2/2014 | Pistoia et al. | 717/126 |

OTHER PUBLICATIONS

Drey, "DAVE-HAL/S: A System for the Static Data Flow Analysis of Single-Process HAL/S Programs," The University of Colorado at Boulder, Boulder, Colorado, http://www.ip.com/pubview/IPCOM000151050D, Nov. 30, 1978, 44 pages.

Prabhu et al., "Interprocedural Exception Analysis for C++," ECOOP 2011, Proceedings of the 25th European Conference on Object-Oriented Programming, Lancaster, United Kingdom, Jul. 25-29, 2011, pp. 583-608.

Vechev et al., "Abstraction-Guided Synthesis of Synchronization," POPL'10, Proceedings of the 37th ACM SIGPLAN-SIGACT Symposium on Principles of Programming Languages, Madrid, Spain, Jan. 17-23, 2010, pp. 327-338.

Tripp et al., "TAJ: Effective Taint Analysis of Web Applications," PLDI '09, Proceedings of the 2009 ACM SIGPLAN Conference on Programming Language Design and Implementation, Dublin, Ireland, Jun. 15-20, 2009, pp. 87-97.

Tateishi et al., "Path- and Index-Sensitive String Analysis Based on Monadic Second-Order Logic," ISSTA '11, Proceedings of the 2011 International Symposium on Software Testing and Analysis, Toronto, Canada, Jul. 17-21, 2011, pp. 166-176.

Office action dated Mar. 27, 2014, regarding USPTO U.S. Appl. No. 13/614,792, 23 pages.

* cited by examiner

DETERMINING CORRECTNESS CONDITIONS FOR USE IN STATIC ANALYSIS

BACKGROUND

1. Field

The invention disclosed and claimed herein generally pertains to a method for use with static analysis of a computer program, wherein the static analysis may show a very large number of discovered violations with respect to a given property. More particularly, the invention pertains to a method of the above type which can substantially reduce the number of discovered violations, by providing conditions for the correctness of the program with respect to the property.

2. Description of the Related Art

Static analysis of computer software enables sound checking to determine whether the subject program violates a property of interest. In security analysis, for example, the property may be vulnerable data flows from source statements (i.e. statements reading user-provided input), to sink statements (i.e. statements that perform security sensitive operations). Soundness in this context means that the analysis reports a superset of all the real, true or actual violations. As an example of security analysis, a security scanner is used which is guaranteed to report all vulnerable flows. However, the scanner may also report as vulnerable a number of flows which in fact are not vulnerable, due to the undecidability of static analysis. Such analysis has to conservatively compensate for (1) missing specifications and (2) genuinely dynamic behaviors, such as reflective code constructs.

In practice, this one-sided error typically yields a poor user interface. This is because a report produced by static analysis is often prohibitive in size, and can comprise thousands, or even tens of thousands, of findings for small-scale and medium scale applications. A static analysis report may also provide many more findings for industry-scale code. It is then up to the user to review all the reported findings, and decide which of them are true and which are spurious. From a usability standpoint, this interface, wherein all potential violations of the relevant property are output to the user, is responsible for many instances where correct problems plagued by the analysis tool are not addressed by the developer. There are often simply too many issues to consider, for the developer to be able to look into all of them.

The problem of overwhelming the user with a prohibitive number of security findings has been frequently acknowledged. The presently used solution is to fuse or merge together distinct findings that are similar or equivalent in some sense. In security analysis, the merge criterion can be based, for example, on the type of vulnerability, e.g., cross-site scripting, SQL injection, and the like, and on the source and sink statements. However, presently used merging is highly limited. Valuable information can be lost because issues are merged too aggressively. Also, the report of violations typically remains too large for practical use, and can still comprise hundreds if not thousands of issues.

SUMMARY

Embodiments of the invention provide an approach to static analysis, wherein the goal is to discover sufficient conditions for the correctness of the entire software program, with respect to a given property. Instead of flagging violations of the property, the static analysis reports a sufficient set of assumptions, such that if these assumptions are satisfied, then the program code is correct. This is expected to yield a report which is much more concise and effective, due to the empirical observation that typically, many distinct issues in a static analysis report are due to the same root cause. The assumptions are then used to invalidate the root cause, and thus obviate large numbers of violations that would otherwise be reported.

One embodiment is directed to a computer implemented method in association with a static analysis of a computer program, wherein the program has a related correctness specification, and the static analysis detects violations of one or more conditions of the correctness specification. The method includes the steps of selectively encoding the program, and adding one or more correctness conditions to the program, wherein the added conditions comprise a set of assumptions that render the program correct with respect to one or more properties pertaining to detected violations. The method further includes reporting the set of assumptions to a program user, together with a request to the user to verify the validity of each assumption of the set.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1A:
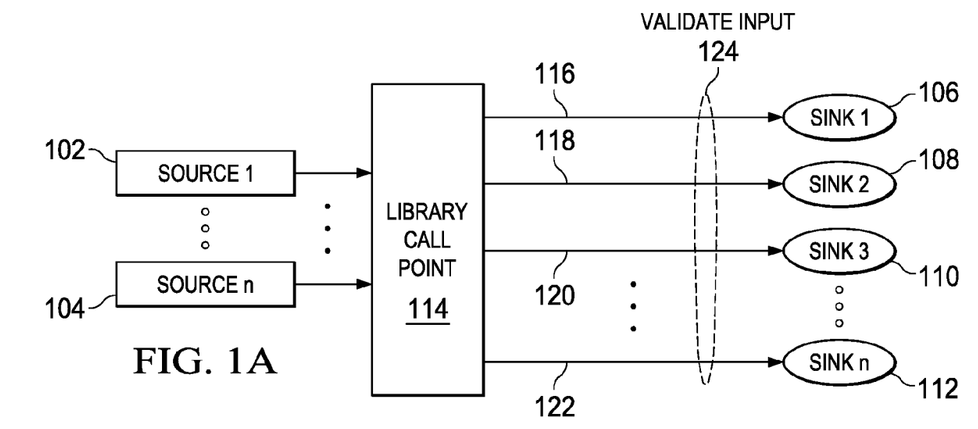
FIGS. 1A and 1B are simplified block diagrams for use in illustrating an embodiment of the invention.

Referring to FIG. 1A, there is shown a simplified diagram for use in illustrating an embodiment of the invention, in connection with the domain of security analysis and the property of secure data flow. More particularly, FIG. 1A shows sources 102 and 104 and sinks 106-112, which are each associated with a computer program that is the subject of static analysis. Sources 102 and 104 represent one or more sources of flows which can extend to the sinks 106-112 in library code, wherein sinks 106-112 represent a number of sinks 1-n. Each flow is accessed through a library call point 114. FIG. 1A specifically shows flows 116-122 directed to sinks 106-112, respectively.

If one of the flows 116-122 was not sanitized prior to the call to the library, that flow would be considered vulnerable by a static security analysis. Accordingly, the flow would be reported as a violation by the static analysis. If the violation was true, then it could be corrected, such as by placing a sanitizer in the path of the flow.

Alternatively, it could happen that some or many of the violations reported by the static analysis were spurious, or in fact were not violations at all. For example, FIG. 1A shows the flows 116-122 all passing through a validation method or milestone 124, referred to as validate input. Thus, each of the flows 116-122 is in fact validated or sanitized. However, it could happen that the specification of the computer program of sources 102-104 and sinks 106-112, for some reason, does not include the validation method 124. Each of the flows 116-122 would then be reported as an unsafe flow violation by the static analysis, even though they were in fact not violations.

It will be seen, of course, that the situation could be readily corrected by adding validation method 124 to the computer program specification.

Figure 1B:
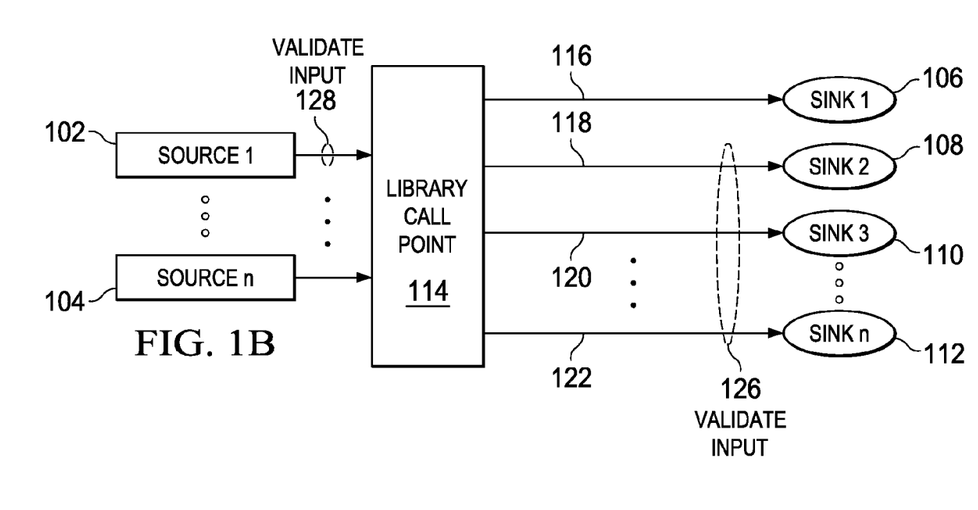

Referring to FIG. 1B, there are shown sources 102-104, sinks 106-112 and flows 116-122, as respectively described above in connection with FIG. 1A. However, instead of validation method 124, the computer program of FIG. 1B has a validation method 126. This validation method is shown to sanitize the flows 118-122, but not the flow 116. Thus, adding validation method 126 to the computer program would prevent violations being reported for flows 118-122, but not for flow 116.

Referring further to FIG. 1B, it is seen that all flows from source 102 that are input to library call point 114 must pass through a validation method 128, and are thus sanitized thereby. Accordingly, if the assumption could be made that any flow 116 to sink 106 must come only from source 102, and from no other source, then flow 116 would always be safe and sanitized.

Figure 2:
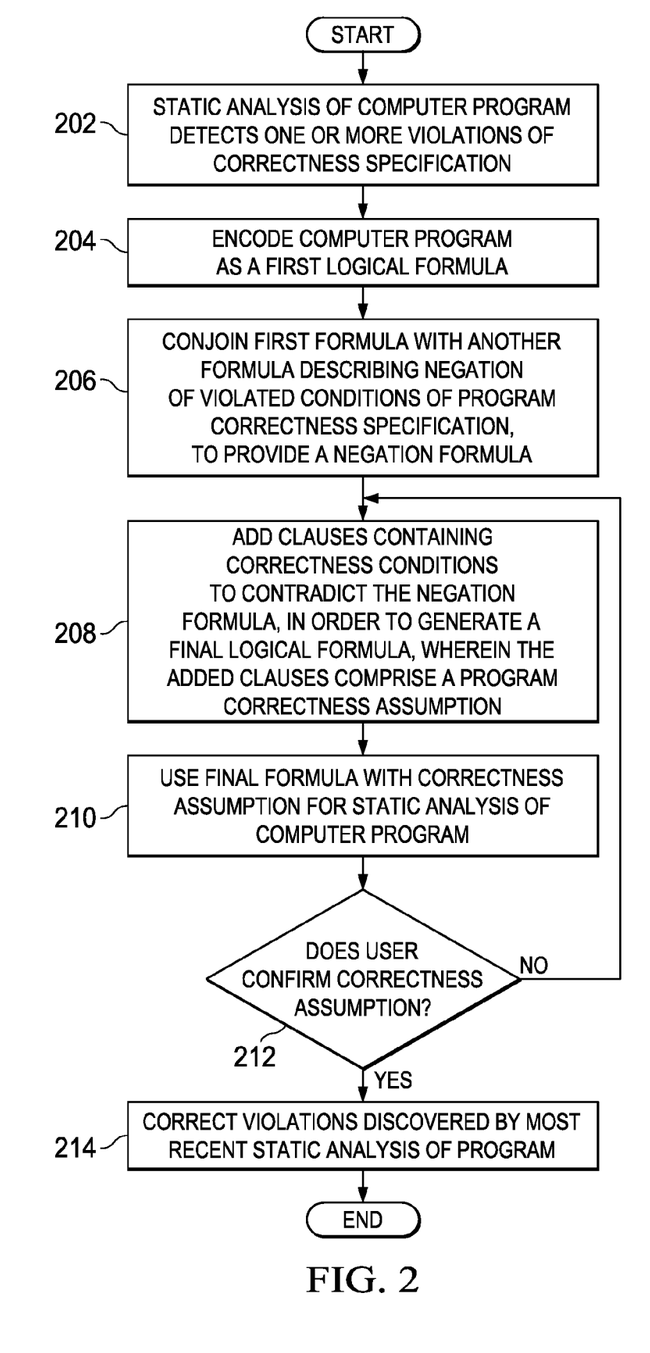
FIG. 2 is a flowchart showing steps of a method comprising an embodiment of the invention.

Referring to FIG. 2, there are shown steps for implementing a method comprising an embodiment of the invention. More particularly, the embodiment pertains to a method for significantly reducing the violations found when applying a static analysis procedure to a specified computer program. Ideally, the only discovered violations would be real or non-spurious violations, for which correction was actually needed. At step 202, a static analysis of the computer program is carried out which initially detects one or more violations.

As is well known by those of skill in the art, a digital computer program comprises logic elements which can each have only one of two possible conditions at any time, such as true or false. Accordingly, the computer program can be encoded into a first logical formula based on its respective logic elements and conditions. This is done at step 204 of FIG. 2.

Typically, the computer program will have an associated correctness specification. This is a set of specified conditions or requirements that must be met, in order for operation of the program to be safe or otherwise correct. Each discovery of a violation occurs because it appears that a condition has not been met. At step 206, the formula comprising the encoded computer program is selectively processed to conjoin or unite it with another formula, which describes the negation of the correctness specification of the computer program. More particularly, such formula describes the negation of each condition of the correctness specification that was shown to be violated, by one of the detected violations. Step 206 is carried out by stating each violated condition of the correctness specification as a negative proposition or condition. The result of step 206 is a negation logical formula, which is constructed so that if the negation logical formula is found to be satisfiable, then the program is potentially unsafe.

As an example of a description negating a correctness specification element of the program, reference is made to FIG. 1. As stated above, flows 116-122 all must be sanitized prior to a call to the library. This condition could be negated, or set forth in a negative way, by the statement that for multiple flows extending from a source to various sinks in library code, which are all accessed through the same library call point, there could be security issues for any flows not shown to be sanitized, prior to the call to the library.

At step 208, clauses containing correctness conditions are added to the negation formula, to contradict the respective negative propositions thereof. The result of this is a final logical formula. The added clauses collectively comprise an assumption that if the final logical formula is satisfiable, then the associated computer program is correct. As an example of a clause added at step 208, the clause would state that all flows 116-122 of FIG. 1 would be sanitized, if they all shared a sanitizing milestone such as validate input 124. It is thus seen that steps 206 and 208 together comprise a two-step process to provide the final logic formula, wherein the final logic formula contains a set of positive conditions. That is, the program will be correct if all the positive conditions are found to be met or verified. It is considered that this will significantly reduce ambiguities in a static analysis procedure.

At step 212, the user is asked to confirm the correctness assumption. If the user does so, the method proceeds to step 214. Otherwise, the method loops back to step 208, and other condition clauses may be assumed. In one embodiment, a history of previously used clauses is maintained, to ensure that new clauses will be used if it is necessary to generate a new assumption.

At step 210 the final logical formula, with the correctness assumption, is used in a static analysis of the computer program. Results of the analysis including any violations are then presented to the user.

Violations discovered by the most recent static analysis are corrected at step 214. In one example of such correction, described above in connection with FIG. 1, flows 116-122 could all be readily shown to be safe by adding validation method 124 to the computer program specification. As a further example of such correction, also pertaining to FIG. 1, the condition would be added that all flows from source 102 are validated, and every flow 116 to sink 106 must come only from source 102.

Figure 3:
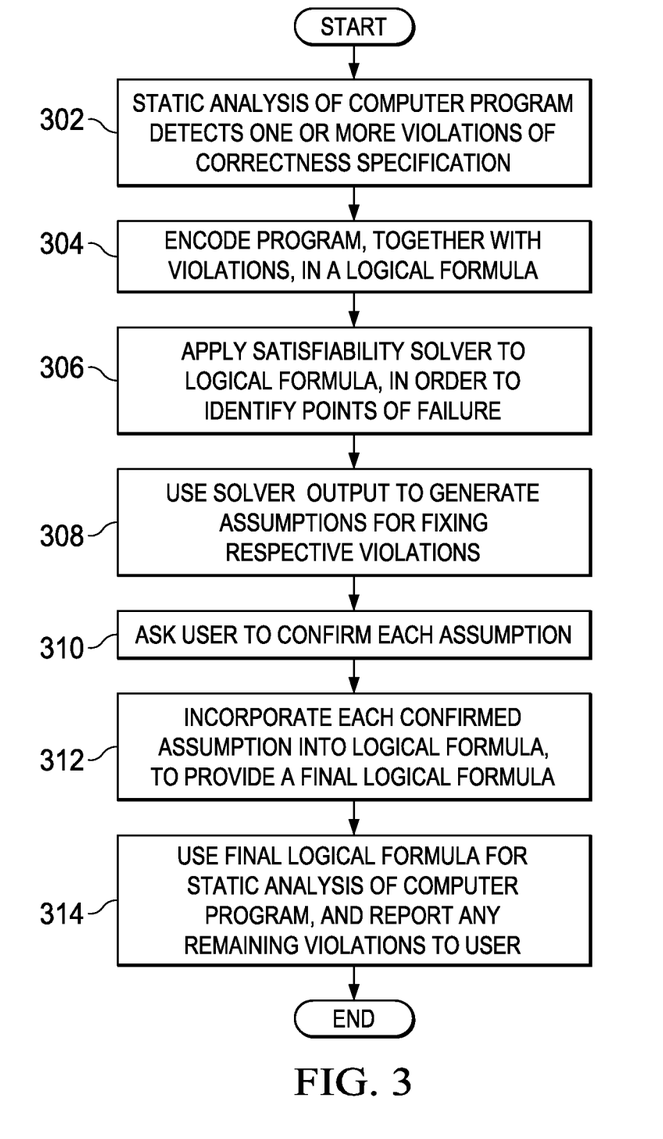
FIG. 3 is a flowchart showing steps of a method comprising a further embodiment of the invention.

Referring to FIG. 3, there are shown steps for a method comprising a further embodiment of the invention. At step 302, a static analysis of the computer program is carried out, which detects one or more violations of the correctness specification of the program.

At step 304, the program is encoded, along with the detected violations, in a logical formula. In one useful embodiment, step 304 may be carried out by implementing steps 204, 206 and 208 of FIG. 2, wherein the logical formula of step 304 comprises the final logical formula of step 208. However, the invention is not limited thereto.

Step 306 applies a satisfiability solver (SAT SOLVER) to the logical formula of step 304. As is known by those of skill in the art, for a propositional logic formula of variables 1-Vn, if the solver finds a satisfying assumption, it will provide a minimal assignment of the variables. That is, a minimal subset of the variables will be set to 1, and the remaining variables (or literals) will be set to zero.

Accordingly, the computer program, together with the violations determined by the static analysis, are encoded into a single long, logical formula, as described above in connection with step 304. Then, at step 306 this formula is feeded into a SAT SOLVER, in order to receive back an output comprising a satisfying assumption with minimal assignment of variables. These variables will then indicate locations in the program at which violation fixes are or may be necessary.

At step 308, the output of the solver is used in generating assumptions for fixing respective examples. For example, as described above, a violation pertaining to flows 116-122 of FIG. 1 could be overcome by assuming that all of these flows were sanitized by passing through a validation method or milestone 124.

Respective assumptions are reported to the user at step 310, and the user is asked to confirm each assumption. Confirmed assumptions are incorporated into the logical formula at step 312, to provide a final logical formula.

At step 314, the final logical formula is used for static analysis of the computer program. Detected violations are reported to the user, for further action.

Figure 4:
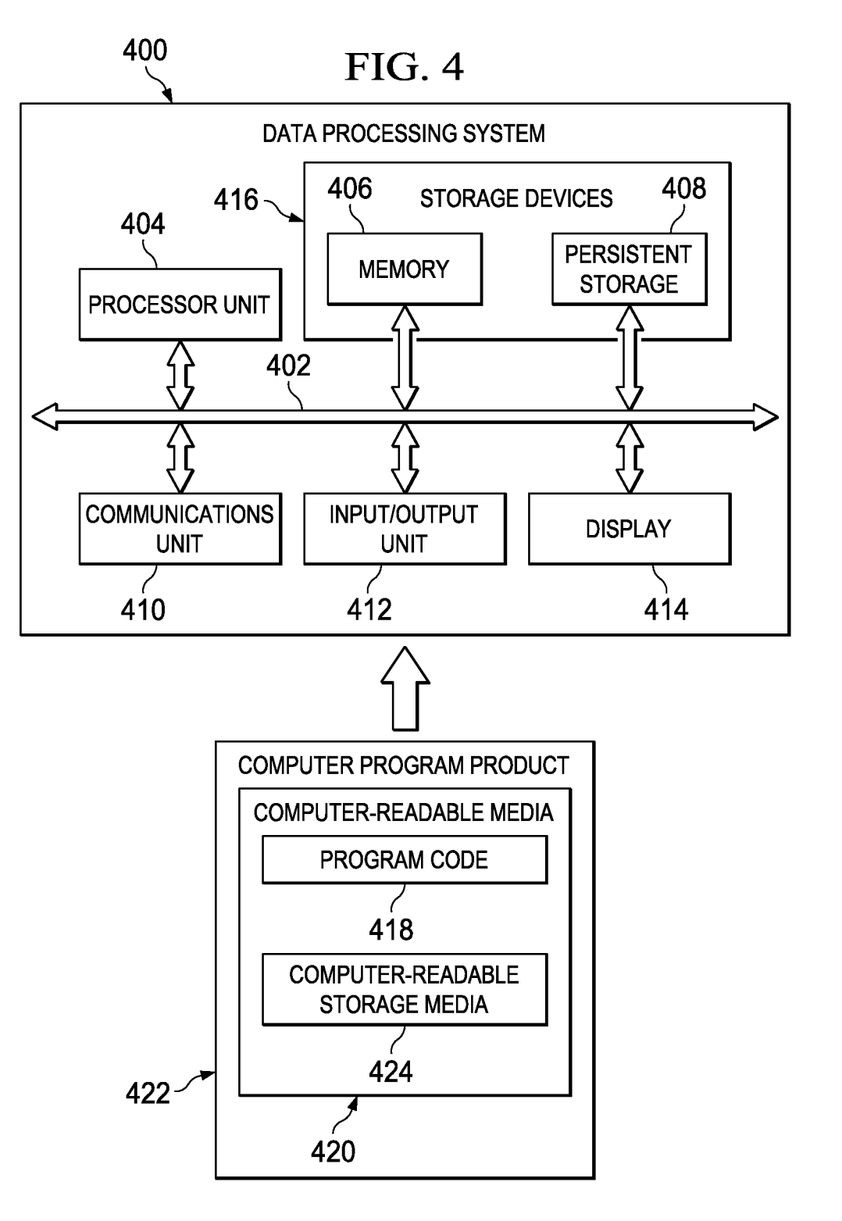
FIG. 4 is a block diagram showing a computer or data processing system that may be used in implementing an embodiment of the invention.

Referring to FIG. 4, a block diagram of a data processing system is depicted, which may be used in implementing embodiments of the invention. In this illustrative example, data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a number of processors, a multi-processor core, or some other type of processor, depending on the particular implementation. A number, as used herein with reference to an item, means one or more items. Further, processor unit 404 may be implemented using a number of heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device is any piece of hardware that is capable of storing information, such as, for example, without limitation, data, program code in functional form, and/or other suitable information either on a temporary basis and/or a permanent basis. Storage devices 416 may also be referred to as computer-readable storage devices in these examples. Memory 406, in these examples, may be, for example, a random access memory or any other suitable volatile or non-volatile storage device. Persistent storage 408 may take various forms, depending on the particular implementation.

For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard, a mouse, and/or some other suitable input device. Further, input/output unit 412 may send output to a printer. Display 414 provides a mechanism to display information to a user.

Instructions for the operating system, applications, and/or programs may be located in storage devices 416, which are in communication with processor unit 404 through communications fabric 402. In these illustrative examples, the instructions are in a functional form on persistent storage 408. These instructions may be loaded into memory 406 for execution by processor unit 404. The processes of the different embodiments may be performed by processor unit 404 using computer implemented instructions, which may be located in a memory, such as memory 406.

These instructions are referred to as program code, computer-usable program code, or computer-readable program code that may be read and executed by a processor in processor unit 404. The program code in the different embodiments may be embodied on different physical or computer-readable storage media, such as memory 406 or persistent storage 408.

Program code 418 is located in a functional form on computer-readable media 420 that is selectively removable and may be loaded onto or transferred to data processing system 400 for execution by processor unit 404. Program code 418 and computer-readable media 420 form computer program product 422 in these examples. In one example, computer-readable media 420 may be computer-readable storage media 424. Computer-readable storage media 424 may include, for example, an optical or magnetic disk that is inserted or placed into a drive or other device that is part of persistent storage 408 for transfer onto a storage device, such as a hard drive, that is part of persistent storage 408. Computer-readable storage media 424 also may take the form of a persistent storage, such as a hard drive, a thumb drive, or a flash memory, that is connected to data processing system 400. In some instances, computer-readable storage media 424 may not be removable from data processing system 400.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 404 may take the form of a hardware unit that has circuits that are manufactured or configured for a particular use. This type of hardware may perform operations without needing program code to be loaded into a memory from a storage device to be configured to perform the operations.

For example, when processor unit 404 takes the form of a hardware unit, processor unit 404 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 418 may be omitted because the processes for the different embodiments are implemented in a hardware unit.

In still another illustrative example, processor unit 404 may be implemented using a combination of processors found in computers and hardware units. Processor unit 404 may have a number of hardware units and a number of processors that are configured to run program code 418. With this depicted example, some of the processes may be implemented in the number of hardware units, while other processes may be implemented in the number of processors.

As another example, a storage device in data processing system 400 is any hardware apparatus that may store data. Memory 406, persistent storage 408, and computer-readable media 420 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406, or a cache, such as found in an interface and memory controller hub that may be present in communications fabric 402.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method, for use with static analysis of a computer program, wherein the program has a related correctness specification and the static analysis detects violations of one or more conditions of the correctness specification, comprising steps of:
   selectively encoding the program to create a negation logical formula of the one or more conditions of the correctness specification pertaining to the detected violations;
   adding one or more correctness conditions to the encoded program, wherein the added conditions comprise a set of assumptions that render the program correct with respect to one or more properties pertaining to detected violations of the negation logical formula to create final logic formula containing a set of positive conditions; and
   reporting the set of assumptions associated with respective detected violations to a program user, together with a request to the user to verify the validity of each assumption of the set.

2. The method of claim 1, wherein:
   responsive to a failure of the user to verify the validity of each assumption of the set of assumptions, the user is subsequently requested to verify the validity of one or more different assumptions.

3. The method of claim 1, wherein selectively encoding the program to create a negation logical formula further comprises:
   the program is encoded as a first logical formula that is selectively processed to generate a second logical formula associated with negation of at least the conditions of the correctness specification pertaining to the detected violations, and the correctness conditions are added to the second logical formula to produce a third logical formula associated with the set of assumptions.

4. The method of claim 3, wherein:
   the second logical formula is generated by conjoining the first logical formula with a formula that describes the negation of at least the conditions of the correctness specification pertaining to the detected violations.

5. The method of claim 3, wherein:
   responsive to the user verifying the validity of each assumption of the set of assumptions, the third logical formula is used for a further static analysis of the computer program, and violations detected thereby are reported to the user.

6. The method of claim 3, wherein:
   responsive to finding a satisfying assumption for a propositional logic formula of the third logic formula, a subset of variables associated with the satisfying assumption are used to locate violations in the computer program.

7. The method of claim 6, wherein:
   a satisfiability solver is used to find a satisfying assumption.

8. The method of claim 1, wherein:
   the set of assumptions includes one of adding a specified element to the correctness specification of the computer program and making a specified fix to the code of the computer program.

9. A computer program product for use with static analysis of a computer program, wherein the program has a related correctness specification and the static analysis detects violations of one or more conditions of the correctness specification, the computer program product comprising a non-transitory computer readable storage medium having instructions stored thereon, which when executed by a computer direct the computer to:
   selectively encode the program to create a negation logical formula of the one or more conditions of the correctness specification pertaining to the detected violations;
   add one or more correctness conditions to the encoded program, wherein the added conditions comprise a set of assumptions that render the program correct with respect to one or more properties pertaining to detected violations of the negation logical formula to create final logic formula containing a set of positive conditions; and
   report the set of assumptions associated with respective detected violations to a program user, together with a request to the user to verify the validity of each assumption of the set.

10. The computer program product of claim 9, wherein the instructions which when executed by the computer, responsive to a failure of the user to verify the validity of each assumption of the set of assumptions, further direct the computer to subsequently request the user to verify the validity of one or more different assumptions.

11. The computer program product of claim 9, wherein the instructions which when executed by the computer to selectively encode the program to create a negation logical formula further direct the computer to:
   encode the program as a first logical formula that is selectively processed to generate a second logical formula associated with negation of at least the conditions of the correctness specification pertaining to the detected violations, and the correctness conditions are added to the second logical formula to produce a third logical formula associated with the set of assumptions.

12. The computer program product of claim 11, wherein the instructions which when executed by the computer further direct the computer to:
   generate the second logical formula by conjoining the first logical formula with a formula that describes negation of at least the conditions of the correctness specification pertaining to the detected violations.

13. The computer program product of claim 11, wherein the instructions which when executed by the computer further direct the computer to:
   responsive to the user confirming the validity of the assumption and added correctness conditions, use the third logical formula for a further static analysis of the computer program, and report violations detected thereby to the user.

14. The computer program product of claim 13, wherein the instructions which when executed by the computer further direct the computer to:
   responsive to finding a satisfying assumption for a propositional logic formula of the third logical formula, use a subset of variables associated with the satisfying assumption to locate violations in the computer program.

15. A computer system, for use with static analysis of a computer program, wherein the program has a related correctness specification and the static analysis detects violations of one or more conditions of the correctness specification, comprising:
   a bus;
   a memory connected to the bus, wherein program code is stored on the memory; and
   a processor unit connected to the bus, wherein the processor unit executes the program code to:

selectively encode the program to create a negation logical formula of the one or more conditions of the correctness specification pertaining to the detected violations;

add one or more correctness conditions to the encoded program, wherein the added conditions comprise a set of assumptions that render the program correct with respect to one or more properties pertaining to detected violations of the negation logical formula to create final logic formula containing a set of positive conditions; and report the set of assumptions associated with respective detected violations to a program user, together with a request to the user to verify the validity of each assumption of the set.

16. The system of claim 15, wherein the processor unit further executes the program code to:

responsive to a failure of the user to verify the validity of each assumption of the set of assumptions, subsequently request the user to verify the validity of one or more different assumptions.

17. The system of claim 15, wherein the processor unit further executes the program code to:

encode the program as a first logical formula that is selectively processed to generate a second logical formula associated with the negation of at least the conditions of the correctness specification pertaining to the detected violations, and the correctness conditions are added to the second logical formula to produce a third logical formula associated with the set of assumptions.

18. The system of claim 15, wherein the instructions which when executed by the computer further direct the computer to:

generate the second logical formula by conjoining the first logical formula with a formula that describes negation of at least the conditions of the correctness specification pertaining to the detected violations.

* * * * *